United States Patent [19]

Lichtwardt

[11] Patent Number: 5,476,287
[45] Date of Patent: Dec. 19, 1995

[54] METHOD AND SYSTEM FOR CONTROLLING THE POSITION OF A SEAT BELT RELATIVE TO AN OCCUPANT OF A VEHICLE

[76] Inventor: John R. Lichtwardt, 1860 Cragin Dr., Bloomfield Hills, Mich. 48302

[21] Appl. No.: 336,839

[22] Filed: Nov. 9, 1994

[51] Int. Cl.⁶ ................................................. B60R 22/00
[52] U.S. Cl. .................... 280/801.2; 280/806; 280/808
[58] Field of Search ................................... 280/806, 607, 280/808, 801.2; 180/268

[56] References Cited

U.S. PATENT DOCUMENTS

| | | | |
|---|---|---|---|
| 4,371,192 | 2/1983 | Alix | 280/801.1 |
| 4,589,680 | 5/1986 | Gürtler et al. | 280/808 |
| 4,600,217 | 7/1986 | Naumann et al. | 280/808 |
| 4,616,141 | 10/1986 | Hollowell | 280/807 |
| 4,655,312 | 4/1987 | Frantom et al. | 180/268 |
| 4,659,108 | 4/1987 | Sack et al. | 280/807 |
| 4,775,167 | 10/1988 | Schiller et al. | 280/808 |
| 4,919,484 | 4/1990 | Bougher et al. | 297/474 |
| 4,966,394 | 10/1990 | Thomas et al. | 280/807 |
| 4,993,748 | 2/1991 | Jambor et al. | 280/808 |

FOREIGN PATENT DOCUMENTS

| | | |
|---|---|---|
| 2646640 | 11/1990 | France . |
| 655281 | 4/1986 | Switzerland . |

*Primary Examiner*—Kenneth R. Rice
*Attorney, Agent, or Firm*—Brooks & Kushman

[57] ABSTRACT

A method and system for generating a minimal amount of slack in a shoulder portion of a seat belt secured over a vehicle occupant to provide comfort and safety to the occupant without interfering with the function and operation of the seat belt. A signal processor is provided for processing control signals, some of which are generated in response to actions taken by the occupant. A pair of fingers grasp, extend, retract and release a shoulder portion of the seat belt in response to a first control signal. The fingers then re-grasp and re-extend the shoulder portion of the seat belt to a fully extended position, thereby providing the minimal amount of slack.

19 Claims, 2 Drawing Sheets

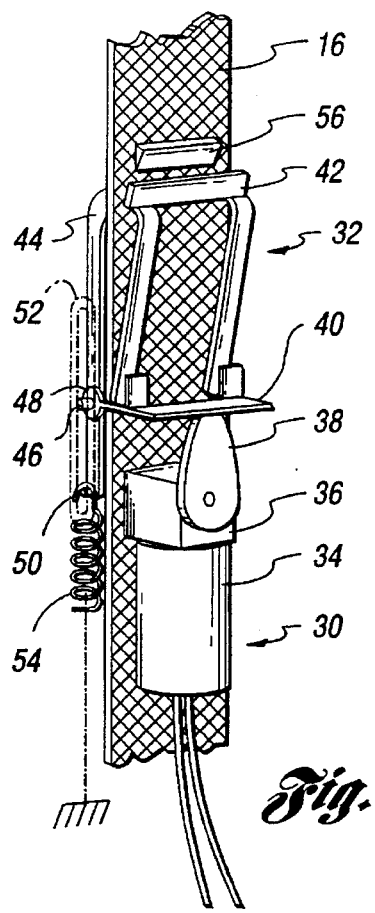
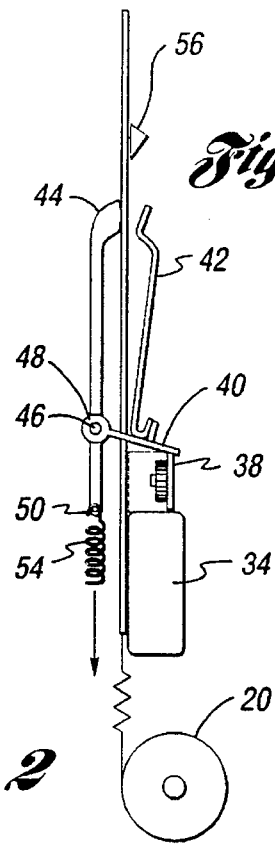
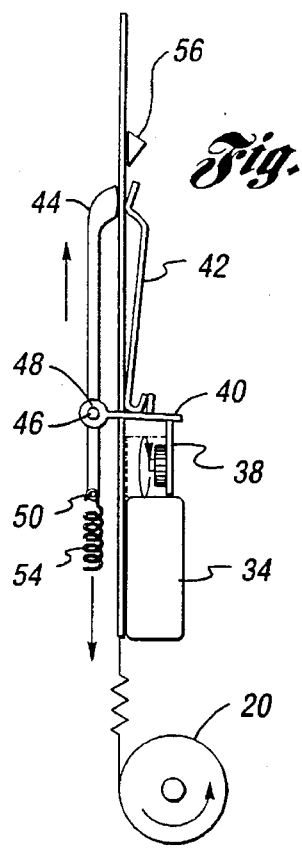
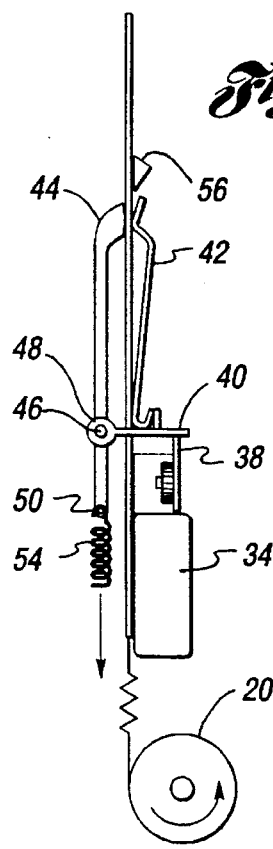
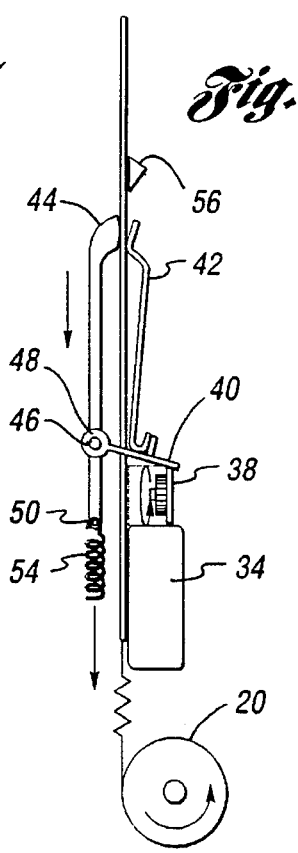
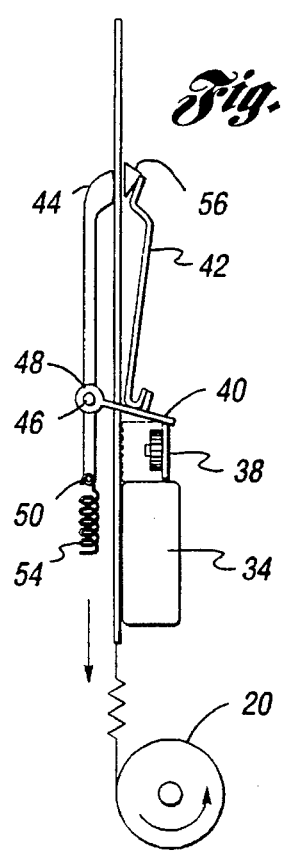

METHOD AND SYSTEM FOR CONTROLLING THE POSITION OF A SEAT BELT RELATIVE TO AN OCCUPANT OF A VEHICLE

TECHNICAL FIELD

This invention relates to vehicle seat belt systems. In particular, this invention relates to a method and system for providing a minimal amount of slack in a shoulder portion of the seat belt when it is fastened over an occupant of the vehicle.

BACKGROUND ART

Current seat belt systems maintain a constant, sometimes objectionable, pressure on a vehicle occupant's shoulder. This uncomfortable pressure may cause the occupant not to use the seat belt system at all or to adjust the shoulder portion of the seat belt in a manner that creates an unsafe situation. In vehicles having airbags, seat belt use is crucial to the effectiveness of the airbags. The inflatable safety devices don't work as well on unbelted passengers.

Previous systems have been designed to remove the pressure of the seat belt from the vehicle occupant in order to promote comfort and thereby the greater use of seat belts. One known seat belt system is the "window-shade" type whereby the seat belt locks in a position away from the body when it is slowly extended. A drawback to such a system is the resulting distance between the seat belt and the occupant, a distance which is fully controllable by the seat belt user and which is often excessive.

The known prior art also discloses automatic seat belt adjustment systems that include belt rewinding mechanisms which release a portion of the seat belt from a position snug against an occupant to provide tensionless comfort to the occupant. One such known system is disclosed in U.S. Pat. No. 4,655,312 issued to Frantom et al. The Frantom et al. reference discloses a seat belt system which upon sensing the seat belt being buckled, a signal is generated which activates a power control to energize the retractor's motor to snug up the seat belt against the occupant's shoulder. A logic control senses when the seat belt is snugged up with a predetermined force and terminates retraction of the seat belt. The logic control then activates a motor power control to reverse the direction of the retractor's motor to play out a small predetermined length of the seat belt. This action relaxes the shoulder portion of the seat belt, thereby removing pressure exerted on the occupant's shoulder and resulting in the occupant feeling unencumbered by the seat belt system. Frantom et al., however, discloses a system that requires extensive modifications to an existing seat belt system. Frantom et al. also discloses a seat belt system that releases the seat belt from the reel rather than from the shoulder portion of the seat belt which does not translate into any significant looseness of the belt.

DISCLOSURE OF THE INVENTION

It is a general object of the present invention to provide a method and system for providing comfort and seat belt safety to an occupant of an automotive vehicle in a simple and inexpensive manner.

It is another object of the present invention to provide a method and system for separating a fastened seat belt from the occupant in a manner which does not alter or interfere with an existing seat belt configuration, function and operation.

It is yet another object of the present invention to provide a method and system for providing and maintaining a minimal amount of slack in the shoulder portion of the seat belt after it is fastened by the occupant of the vehicle.

A further object of the present invention is to provide a method and system for providing a minimal amount of slack in the shoulder portion of the seat belt in response to movement by the occupant causing pressure to be exerted against the seat belt.

Still another object of the present invention is to provide a method and system for providing a minimal amount of slack in the shoulder portion of the seat belt periodically in an automatic fashion to insure proper positioning of the seat belt.

In carrying out the above objects and other objects, features and advantages, of the present invention, a method is provided for controlling the position of a seat belt relative to an occupant of a vehicle. The method includes the initial step of generating a first control signal in response to a first action taken by the occupant. Next, in response to the first control signal, the method continues with the steps of grasping the shoulder portion of the seat belt and extending away from the occupant. Then, the method includes the steps of retracting the extended shoulder portion back towards the occupant and releasing the shoulder portion. Finally, the method includes the steps of re-grasping and re-extending the shoulder portion, thereby providing a minimal amount of slack to the occupant of the vehicle.

In further carrying out the above objects and other objects, features and advantages, of the present invention, a system is also provided for carrying out the steps of the above described method.

The above objects, features and advantages of the present invention, as well as others, are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all of the views, wherein:

FIG. 2 is a perspective view of the preferred embodiment of the system of the present invention;

FIG. 3 is a side elevational view of the system of the present invention in an inactive, fully retracted position;

FIG. 4 is a side elevational view of the system of the present invention in a seat belt engaged and extending position;

FIG. 5 is a side elevational view of the system of the present invention in a maximum extension position;

FIG. 6 is a side elevational view of the system of the present invention in a seat belt retracting position; and FIG. 7 is a side elevational view of the system of the present invention in a position where the seat belt is pulled beyond the fully extended position.

BEST MODE FOR CARRYING OUT THE INVENTION

Figure 1:
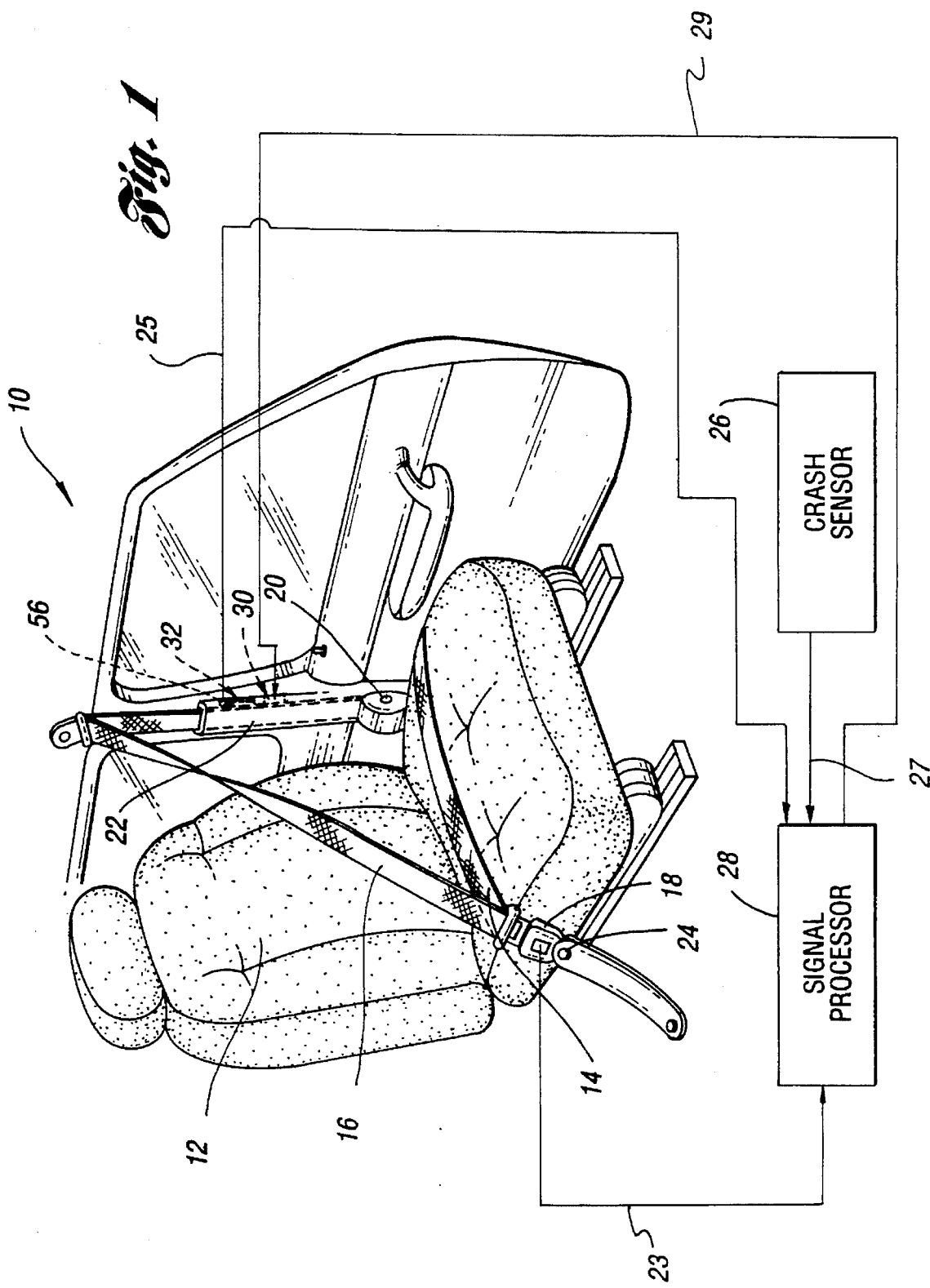
FIG. 1 is a schematic environmental view of the preferred embodiment of the system of the present invention.

Referring to FIG. 1, there is shown an overall view of the seat belt positioning system 10 of the present invention in an automotive vehicle. An automobile car seat 12 is shown with a conventional seat belt having a lap portion 14 and a shoulder portion 16. The shoulder portion 16 extends across the body of an occupant. The seat belt is secured across the lap of the occupant by a buckle 18. The seat belt is controlled by a retractor assembly 20 mounted within the door post assembly 22 of the automobile.

The seat belt system 10 of the present invention includes means for generating a first control signal on a line 23 to a signal processor 28. The first control signal is generated in response to a first action by the occupant. The first action by the occupant may include fastening of the seat belt. In this case, the sensor may be a buckle sensor or switch 24 which is normally open and is closed when the seat belt strap connector fitting is inserted into the buckle 18.

Movement by the occupant causing pressure to be exerted against the shoulder portion 16 of the seat belt causes a different control signal to appear on line 25 to the signal processor 28.

A conventional crash sensor 26 may also cause a control signal to appear on a line 27 to the signal processor 28.

The signal processor or processing means 28 processes the control signals to provide actuating signals in response thereto. The signal processor 28 may be any conventional signal processor known by individuals skilled in the art. The processor 28 may be a microcomputer programmed to provide the actuating signals immediately or after a brief delay following the receipt of the control signals.

In addition, the seat belt system 10 also includes an actuating means 30 responsive to the actuating signals generated by the signal processing means 28. The actuating means 30 actuates a grasping means 32 which performs a series of actions to minimally extend the shoulder portion 16 of the seat belt so as to provide slack in the seat belt against the occupant. The slack in the seat belt decreases the amount of contact of the belt against the occupant thereby increasing the comfort level of the occupant. The actuating means 30 and the grasping means 32 will be described in more detail in conjunction with FIG. 2.

In response to a first control signal received on line 23 and processed by processor 28, a first actuating signal is provided on a line 29 extending to the actuating means. The actuating means 30 causes the grasping means 32 to initially grasp the shoulder portion 16 of the seat belt. Next, the grasping means 32 extends the shoulder portion 16 away from the occupant to a fully extended position. Upon reaching the fully extended position, the grasping means 32 retracts the extended shoulder portion 16 back towards the occupant. The grasping means 32 then releases the shoulder portion 16 in a fully retracted position. Finally, the grasping means 32 again grasps and re-extends the shoulder portion 16 to the fully extended position, thereby providing a minimal amount of slack in the seat belt.

The seat belt system 10 of the present invention further includes means for automatically generating a second control signal periodically. The second control signal is processed by the signal processing means 28 which, in turn, provides a second actuating signal on the line 29. The actuating means 30 is responsive to the second actuating signal in order to actuate the grasping means 32.

The signal processing means 28 may be configured with a timer to generate the second control signal periodically and to subsequently process the second control signal to generate the second actuating signal. While the first control signal may be generated upon the initial fastening of the seat belt by the occupant or during the period of time that the seat belt is fastened, the second actuating signal is utilized to insure proper positioning of the belt even when there has not been any appreciable movement by the occupant. For example, the second actuating signal will prevent the seat belt from remaining extended from the body in a situation where the occupant continues sitting in a forward position for a prolonged period of time before settling back in the seat.

Still further, the seat belt system 10 of the present invention includes means for generating a third control signal in response to a second action taken by the occupant. The third control signal, which may appear on either line 23 or line 27, is processed by the signal processing means 28 which, in turn, provides a third actuating signal. The actuating means 30 is responsive to the third actuating signal in order to release and retract the grasping means 32.

The second action taken by the occupant may be the act of unfastening the seat belt. In this case, the buckle sensor 24 is configured to generated the third control signal when the occupant releases the seat belt from the buckle 18. The actuating means 30 and the grasping means 32 thereby release the seat belt so as to permit the released seat belt to retract freely to a storage position.

Alternatively, the third control signal may be generated by the crash sensor 26.

Turning now to FIG. 2, there is shown a perspective view of the system of the present invention in a final extended position. The actuating means 30 of the seat belt system 10 includes a motor 34, such as a stepper motor with a rotatable shift (not shown). The motor 34 is activated upon receiving an actuating signal from the signal processing means 28.

The actuating means also includes a transmission means which is necessary in order to convert a rotary motion of the shaft of the motor 34 into linear motion of the grasping means 32 along the shoulder portion 16 of the seat belt. The transmission means includes gearing in the form of a gear box 36 coupled to the motor shaft. The gear box 36 converts the rotary motion of the motor shaft about a first vertical axis into rotary motion of a cam 38 about a second horizontal axis. The second horizontal axis is substantially perpendicular to the first vertical axis.

The cam 38 is elliptical and is eccentrically mounted as a shaft of the gear box 36. The cam 38 also supports a bottom surface of a plate of the grasping means 32 at its outer circumferential surface. As the cam 38 rotates about the second horizontal axis, the plate 40 initially rotates about a third horizontal axis and then moves along another vertical axis. The third horizontal axis is substantially perpendicular to the second horizontal axis. The shape, configuration and size of the cam 38 will control the nature and the distance of the extension of the seat belt and the rate of extension and retraction of grasping means 32.

The grasping means 32 also includes first and second fingers 42,44. The first finger 32 is supported on the plate 40. The fingers 42 and 44 grasp the shoulder portion 16 of the seat belt and move in response to the movement of the plate 40. The first finger 42 is flexible and is attached to a top surface of the plate 40. The second finger 44 is a rigid finger pivotally connected to the plate 40 by a first rod 46 at a joint 48.

As the cam 38 rotates, the plate 40 moves so as to compress the flexible finger 42 against the shoulder portion 16 of the seat belt and the rigid finger 44. This action causes the fingers 42, 44 to grasp the seat belt in response to the rotation of the cam 38.

The rigid finger 44 also includes a second small rod 50 at its lower end. The first and second rods 46 and 50, respectively, move along and in a fixed guiding means 52, such as a track, to insure liner movement along the first vertical axis.

Attached to the rigid finger 44 is a spring or elastic mechanism 54 which gently resists extension of the fingers 42, 44 while the fingers 42, 44 engage the shoulder portion 16 of the seat belt. The spring 54 also assists in the return of the fingers 42, 44 when the rotation of the cam 38 causes the seat belt to retract back towards the occupant of the vehicle.

Turning now to FIG. 3, there is shown the system 10 of the present invention in an inactive and fully retracted position. The fingers 42, 44 are unattached from the shoulder portion 16 of the seat belt. Incorporated into the joint 48 is a small spring (not shown) which gently depresses the plate 40 thereby separating the fingers 42, 44 when the system 10 is in the fully inactive and retracted position.

FIG. 4 illustrates the system 10 moving in an extending mode through the lengthening action of the cam 38 against the plate 40. When the system 10 is activated, the cam 38 begins rotating against the plate 40 and flexible finger 42 moves to compress the shoulder portion 16 of the seat belt against the rigid finger 44. As the rotation of the cam 38 continues with increasing radius and pressure against the plate 40, the fingers 42, 44 grasp the seat belt and begin moving as a unit in the extending mode while overcoming the counter force of the spring 54. The compression of the seat belt between the fingers 42, 44 is minimal and sufficient only to overcome the retractile tension of the retractor assembly 20 on the shoulder portion 16.

The maximum or fully extended position of the system 10 is illustrated in FIG. 5. The cam 38 has reached its maximum radius as it pushes against the plate 40 with the fingers 42, 44 engaging the seat belt.

FIG. 6 illustrates the retraction action of the system 10. The fingers 42, 44, while engaging the seat belt, retract with the shoulder portion 16 as the cam 38 rotates with decreasing radius against the plate 40 which is held in contact with the cam 38 by the gentle force of the spring 54. The fingers 42, 44 release the seat belt near the end of the retractile movement with the aid of the spring in the joint 48. The retractile movement is limited by the shortest radius of the member 38 and/or by the rod 50 contacting the lower end of the fixed track 52.

FIG. 7 illustrates the further extension of the seat belt resulting from body movement of the belted occupant of the vehicle. The fingers 42, 44 with the engaged seat belt move upon further extension of the seat belt. An electrical contact 56, preferably wedge shaped and positioned just beyond the end of flexible finger 42 in the normal fully extended position (FIG. 5), is engaged when the seat belt is further extended through movement by the occupant. When the electrical contact 56 is engaged, the fingers 42, 44 are released from the seat belt by both mechanically moving the flexible finger 42 away from the seat belt by the wedged configuration of the contact 56 and also by the contact 56 creating a fourth control signal on line 25 which is processed by the signal processor 28. In turn, the processor 28 electrically activates or actuates the motor 34 which returns the system 10 to the inactive position (FIG. 3).

The initial step of the present invention includes the step of generating a first control signal in response to a first action taken by the vehicle occupant. The first action includes fastening of the seat belt by the occupant.

Next, the method continues with the step of grasping the shoulder portion 16 of the seat belt in response to the first control signal.

Next, the method continues with the step of extending the shoulder portion 16 of the seat belt away from the occupant toward a fully extended position (FIG. 4).

The system 10 of the present invention may be configured to stop at this extended position (FIG. 5) or to proceed to retract the seat belt back toward the vehicle occupant (FIG. 6).

The shoulder portion 16 of the seat belt is released in the fully retracted position (FIG. 2). Then, the shoulder portion is re-grasped and re-extended by continued rotation of the cam 38. As a result, a minimal amount of slack in the seat belt results.

As previously mentioned, the system 10 of the present invention may be configured to automatically and periodically generate a second control signal which causes the sequence of grasping, extending, retracting and releasing the seat belt to be repeated before ultimately stopping in the maximum extended position (FIG. 5). The repeated sequence of grasping, extending, retracting and releasing the seat belt permits the user time to settle in the seat when first entering the vehicle and fastening the seat belt or when the seat belt is disengaged from the system 10 after body movement against the seat belt (FIG. 7). By periodically repeating the sequence of grasping, extending, retracting and releasing the seat belt, a proper, safe and comfortable position of the shoulder portion 16 of the seat belt upon the occupant is monitored.

Furthermore, the method of the present invention includes generating a third control signal in response to a second action taken by the occupant and preventing the grasping, extension, retraction and release of the seat belt. A second action taken by the occupant, such as unfastening of the seat belt, activates the system 10 to release the belt from the engaged position (FIG. 5) and return the system 10 to the inactive and detached position (FIG. 3) thereby permitting the belt to retract freely into a storage position.

The system 10 of the present invention is also configured to release the seat belt from the fully extended position (FIG. 5) and return the system 10 to the inactive position (FIG. 3) upon experiencing significant vehicle impact in vehicles equipped with a mechanism which instantly tightens the seat belt against the occupant during impact. The gentle grasping of the seat belt by the fingers 42, 44 does not interfere with the sudden tightening of the seat belt upon impact, just as it does not interfere with voluntary body movement against the seat belt during the normal course of movement by the belted occupant.

While the best modes for carrying out the invention have been described in detail, those familiar with the art to which this invention relates will recognize various alternative designs and embodiments for practicing the invention as defined by the following claims.

What is claimed is:

1. A method for controlling the position of a shoulder portion of a seat belt relative to an occupant of a vehicle, the method comprising:

generating a first control signal in response to a first action taken by the occupant; and in response to the first control signal,
  (a) grasping the shoulder portion of the seat belt;
  (b) extending the grasped shoulder portion away from the occupant;
  (c) retracting the extended shoulder portion back towards the occupant;
  (d) releasing the shoulder portion of the seat belt; and
  (e) repeating steps (a) and (b) to thereby re-extend the shoulder portion.

2. The method of claim 1 further comprising repeating steps (a) through (d) prior to step (e) in response to the first control signal.

3. The method of claim 1 wherein the first action includes fastening of the seat belt by the occupant.

4. The method of claim 1 further comprising automatically and periodically generating a second control signal and repeating steps (c) through (e) in response to the second control signal.

5. The method of claim 1 further comprising generating a third control signal in response to a second action taken by the occupant or on vehicle impact and repeating steps (c) and (d) in response to the third control signal.

6. The method of claim 1 further comprising generating a fourth control signal in response to movement by the occupant which causes extended movement of the shoulder portion of the seat belt and repeating steps (c) and (d).

7. The method of claim 5 wherein the second action includes unfastening of the seat belt by the occupant.

8. A system for controlling the position of a shoulder portion of a seat belt relative to an occupant of a vehicle, the system comprising:

means for generating a first control signal in response to a first action taken by the occupant;

signal processing means for processing the first control signal to provide an actuating signal in response thereto;

actuating means responsive to the actuating signal; and grasping means having a fully retracted position and a fully extended position and being actuated by the actuating means to cause the grasping means to:

grasp a shoulder portion of the seat belt in the fully retracted position;

extend the grasped shoulder portion away from the occupant to the fully extended position;

retract the extended shoulder portion back towards the occupant;

release the retracted shoulder portion of the seat belt in the fully retracted position;

re-grasp the shoulder portion of the seat belt in the fully retracted position; and re-extend the re-grasped shoulder portion away from the occupant to the fully extended position.

9. The system of claim 8 wherein the means for generating is a sensor adapted to be coupled to the seat belt for sensing fastening of the seat belt by the occupant.

10. The system of claim 8 further comprising means for automatically and periodically generating a second control signal for processing by the signal processing means wherein the signal processing means provides a second actuating signal and wherein the actuating means is responsive to the second actuating signal to actuate the grasping means to move from the fully extended position back to the fully retracted position and then back again to the fully extended position.

11. The system of claim 8 further comprising means for generating a third control signal in response to a second action taken by the occupant or on vehicle impact wherein the signal processing means processed the third control signal and provides a third actuating signal and wherein the actuating means is responsive to the third actuating signal to actuate the grasping means to move from the fully extended position to the fully retracted position.

12. The system of claim 8 wherein the actuating means includes a motor having a rotary shaft and a transmission for converting rotary motion of the shaft into linear motion of the grasping means.

13. The system of claim 12 wherein the transmission includes gearing coupled to the shaft of the motor and an eccentric cam rotatably mounted on the gearing.

14. The system of claim 13 wherein the gearing converts rotary motion of the shaft about a first axis to rotary motion of the cam about a second axis, the first axis being substantially perpendicular to the second axis.

15. The system of claim 14 wherein the grasping means includes a pivotally mounted plate for riding on a circumferential surface of the cam and wherein the cam initially converts rotary motion about the second axis to rotary motion of the plate about a third axis and then converts the rotary motion about the second axis to linear motion of the grasping means, the third axis being substantially perpendicular to the second axis.

16. The system of claim 12 further comprising guiding means for guiding the linear motion of the grasping means.

17. The system of claim 15 wherein the grasping means further includes first and second fingers, the first finger being flexible and supported on the plate and the first and second fingers being adapted to grasp the shoulder portion of the seat belt therebetween.

18. The system of claim 17 further comprising a device in the form of a wedge-shaped mechanism disposed beyond the fully extended position for mechanically separating the fingers from the shoulder portion of the belt.

19. The system of claim 8 further comprising a device coupled to the signal processing means for sensing movement of the grasping means beyond the fully extended position to generate a fourth control signal for processing by the signal processing means to provide a fourth actuating signal and wherein the actuating means is responsive to the fourth actuating signal to actuate the grasping means to move back to the fully retracted position.

* * * * *